United States Patent [19]
Nagy et al.

[11] 3,782,762
[45] Jan. 1, 1974

[54] THEFT PROOF VEHICLE TRAILER HITCH CONNECTION

[76] Inventors: Charles E. Nagy, 3221 Benda Pl., Hollywood, Calif. 90023; John F. Nagy, 785 W. End Ave., New York, N.Y. 10025; Bernard Miller, 11 Fig Tree Rd., Portugese Bend, Calif. 90274

[22] Filed: Feb. 29, 1972

[21] Appl. No.: 230,333

[52] U.S. Cl. ............................. 280/507, 280/511
[51] Int. Cl. ...................................... B60d 1/06
[58] Field of Search .................... 280/491, 406, 507, 280/511, 512

[56] References Cited
UNITED STATES PATENTS

| | | | |
|---|---|---|---|
| 1,574,461 | 2/1926 | Witsberger | 280/511 X |
| 2,189,864 | 2/1940 | McDaniel | 280/512 UX |
| 3,482,856 | 12/1969 | Reese | 280/406 A X |
| 2,850,293 | 9/1958 | Hall | 280/491 E X |
| 3,226,133 | 12/1965 | Geresy | 280/507 X |

FOREIGN PATENTS OR APPLICATIONS

| | | | |
|---|---|---|---|
| 516,467 | 9/1955 | Canada | 280/511 |

*Primary Examiner*—Leo Friaglia
*Assistant Examiner*—Randall A. Schrecengost
*Attorney*—Laforest S. Saulsbury

[57] ABSTRACT

A hitch connection has been provided for vehicle trailers in which the parts can be disconnected from one another by a special shaped hitch pin or the parts can be left connected with one another and detachably removed as a unit from between the trailer and the vehicle and transferred to a location where the unit is inaccessible to unauthorized persons. A universal ball and socket connection is afforded between a bracket and plate socket parts in which a ball is carried upon a hexagonal shank carried on a bracket part and plates have openings adapted to fit over the upper and lower halves of the ball. The ball being held against rotation upon the hexagonal section pin by a complementary opening in the ball and the hexagonal pin being held against rotation between supporting arms on a bracket by hexagonal shaped openings so that all movement between the vehicle and trailer hitch parts is effected upon the ball fixedly carried upon the vehicle and so that the trailer hitch part can tilt up and down and swing free laterally. The vehicle bracket and trailer hitch parts are provided with prongs adapted to be inserted in hollow tubes carried on the vehicle and on the trailer tongue allowing thereby the hitch connection to be releasably removed from the vehicle and trailer as a unit, the same being held in place thereon by removable pins extendable through the tubes and the prongs. The bracket and the trailer parts are designed according to certain forms of the invention to be formed from metal plate stampings or forgings.

9 Claims, 13 Drawing Figures

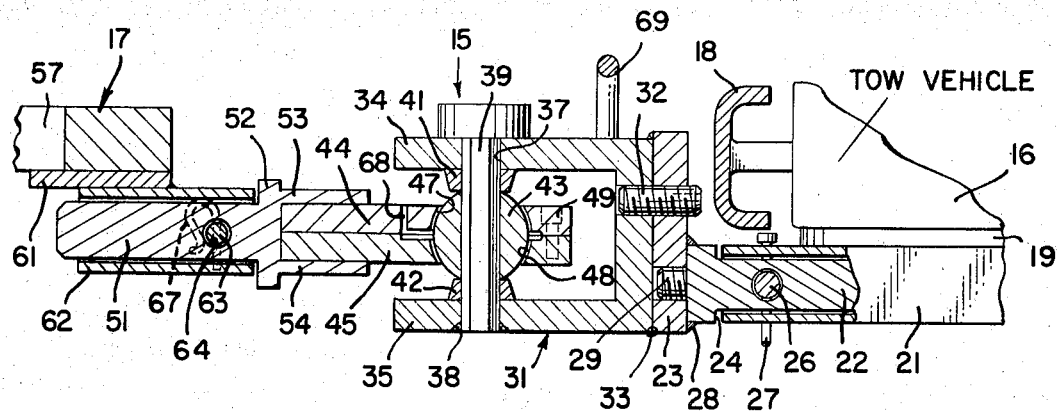
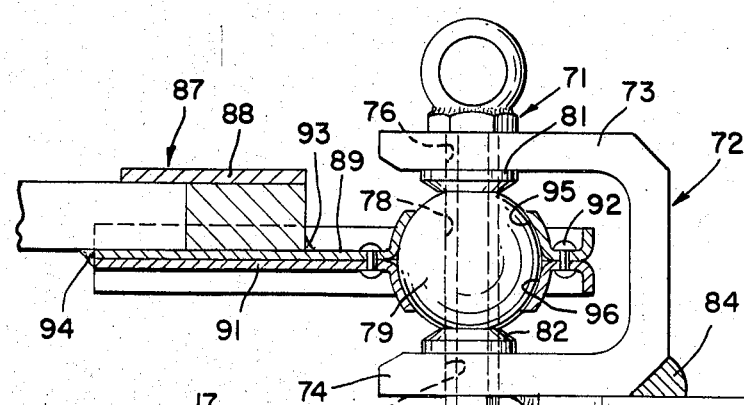
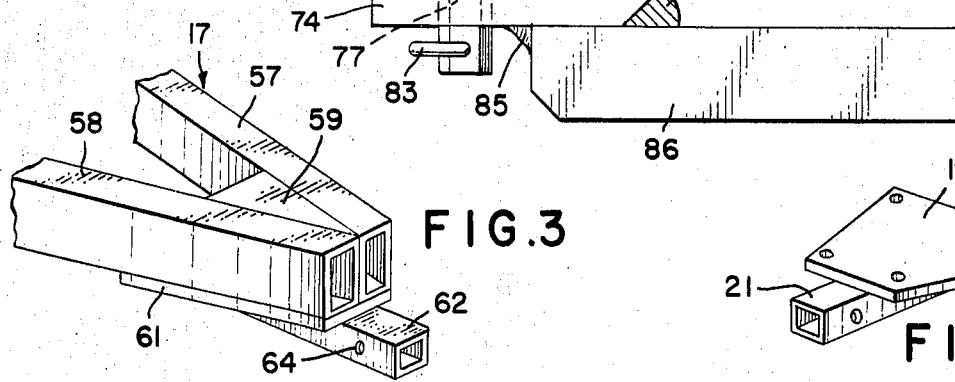
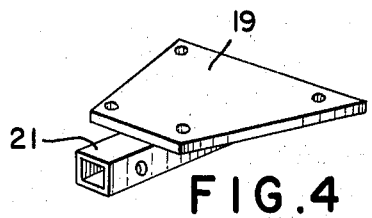

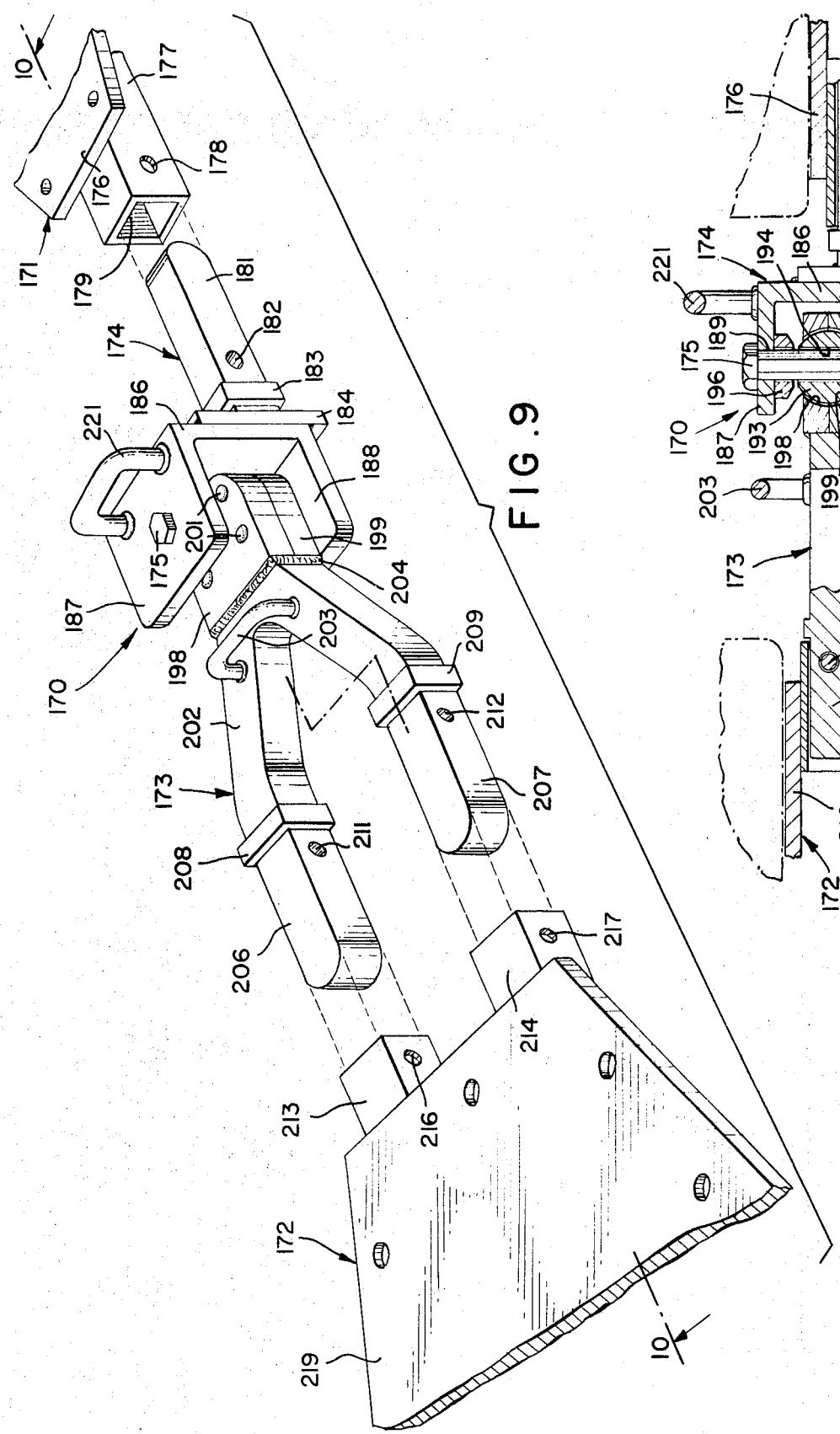

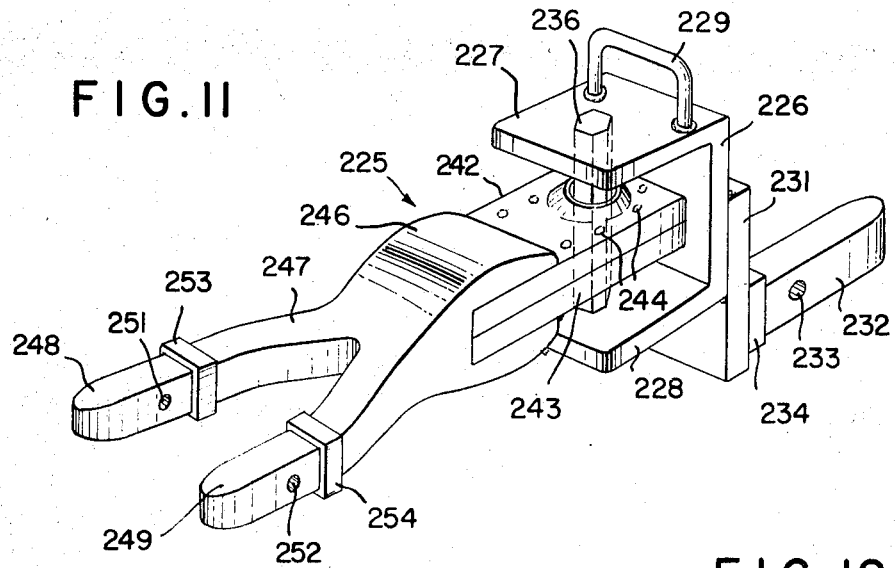
FIG.11
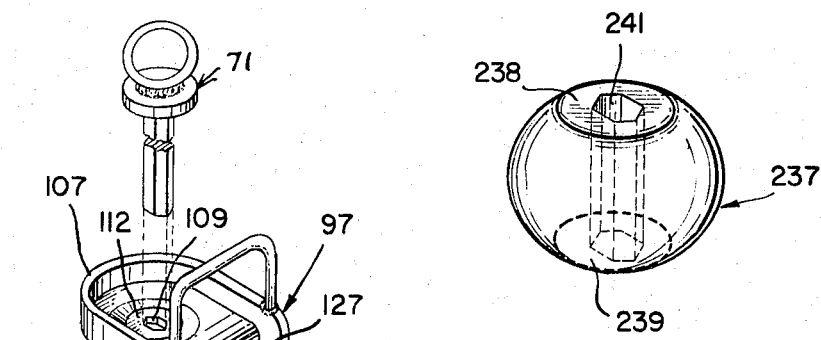
FIG.12
FIG.13
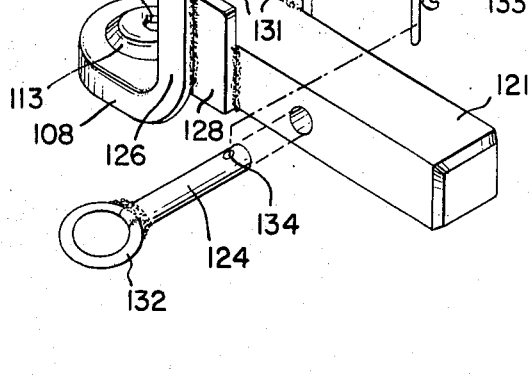

THEFT PROOF VEHICLE TRAILER HITCH CONNECTION

This invention relates to a theft proof hitch connection for vehicle trailers.

It is an object of the present invention to provide a hitch connection that can be removably taken from between the vehicle and the trailer when not in use and transported to a location or concealed in the vehicle to eliminate the possibility of unauthorized persons making use of the trailer hitch connection for driving away with the trailer.

It is another object of the invention to provide a simple means for connecting the vehicle and trailer parts of the hitch connection to one another for permitting freedom of movement of the trailer relative to the vehicle to keep down the number of parts in the making of a hitch connection device.

It is still another object of the invention to provide a simple ball and socket arrangement for hitch connection for vehicle trailers that includes a ball that is connected by a hexagonal shaped opening to a hexagonal shaped pin so that the ball automatically will be held against rotation of the pin and wherein the pin will be fitted into hexagonal brackets on the openings to keep the pin from rotational movement on the bracket and a fixed ball for the connection thereto of a universal socket assembly of the hitch trailer part.

It is still a further object of the invention to provide a hitch connection which permits the stamped or forged parts and slidable prongs for detachably connecting the hitch parts to the vehicle and to the trailer.

It is still a further object of the invention to provide a hitch connection in which the hitch trailer part is provided with a yoke and two prongs laterally spaced from one another for attachment to the trailer whereby the trailer will be made rigid with the hitch part and the hitch part held against rotational displacement upon the trailer, the double prongs being respectively received in spaced tubes on the trailer and in a releasable manner.

Other objects of the invention are to provide a hitch connection having the above objects in mind, which is of simple construction, has a minimum number of parts, inexpensive to manufacture, easy to assemble upon the vehicle and trailer, which can be disconnected with little effort, rugged and durable, pleasings in appearance and effective and efficient in use.

For a better understanding of the invention reference may be had to the following detailed description taken in connection with the accompanying drawings, in which:

FIG. 1 is a top plan view of a vehicle and trailer hitch connection device that is removable as a unit and can be concealed against one who would be tempted to steal the trailer and in this way provides for an antitheft hitch connection, the hitch connection being removable from both the vehicle and the trailer.

FIG. 2 is a fragmentary longitudinal sectional view of the trailer hitch connection device and the tow vehicle, the view being taken on line 2—2 of FIG. 1 and through the universal ball and plate assembly of the hitch connection.

FIG. 3 is a fragmentary perspective view of the trailer tongue and a square tube assembly secured to the underside of the trailer tongue for receiving the hitch connection device shaft attaching member.

FIG. 4 is a perspective view of the square tube assembly and plate adapted for use with the hitch connection device and secured to the underside of the forward end of the trailer tongue.

FIG. 5 is a fragmentary longitudinal sectional view of a hitch connection employing the universal ball according to the present invention in which the parts connected to the trailer are formed of stampings secured together and containing the ball and a pin removable from a U-shaped bracket to release the ball and the surrounding trailer plates from the bracket, the bracket being similarly fixed to the tow vehicle, and a solitary pin being liftable upwardly from the bracket to disconnect the trailer from the vehicle.

Figure 6:
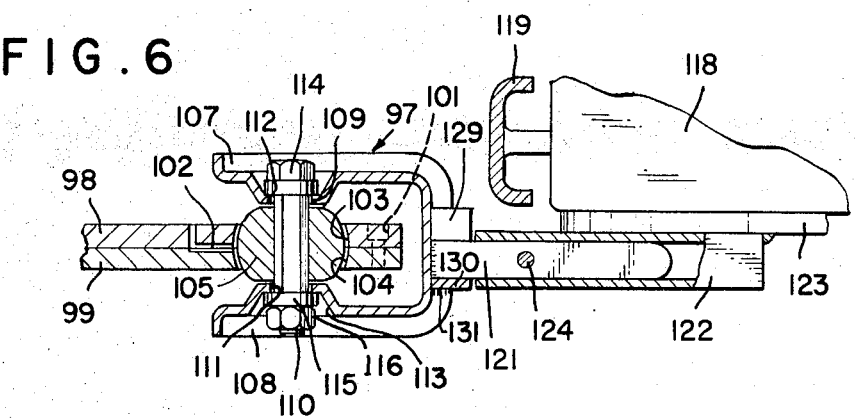

FIG. 6 is a fragmentary longitudinal sectional view of a trailer vehicle hitch connection device employing a universal ball and constructed according to a still further form of the invention wherein the ball is carried by the plates formed of stampings and connected to the trailer tongue and wherein the U-shaped bracket is made from a stamping and has an attaching shaft for detachable connection with a square tube on the tow vehicle, the ball bolt being removable also to detach the trailer from the vehicle.

Figure 7:
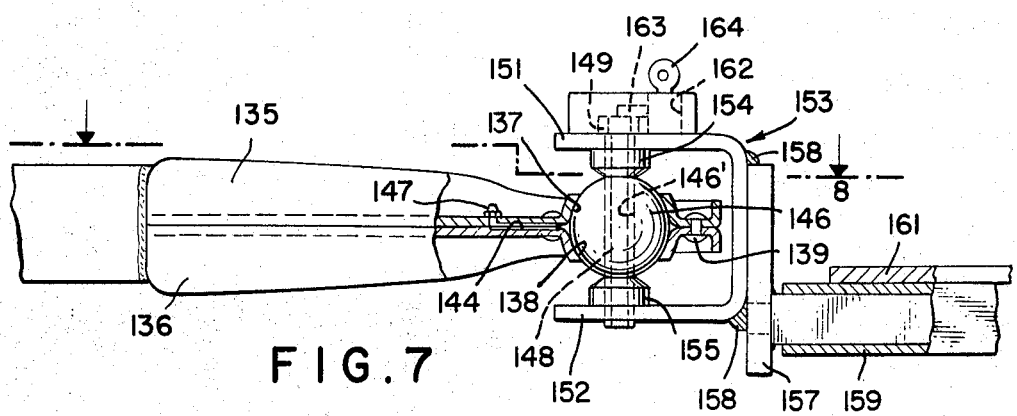

FIG. 7 is a longitudinal side view of a trailer hitch connection constructed according to a still further form of the invention wherein the trailer ball hitch plates are formed of stampings connected together and welded to the trailer tongue, the ball bolt being removable and normally secured in place by a key latch, the bracket containing the key latch being permanently fixed to the underside of the vehicle.

Figure 8:
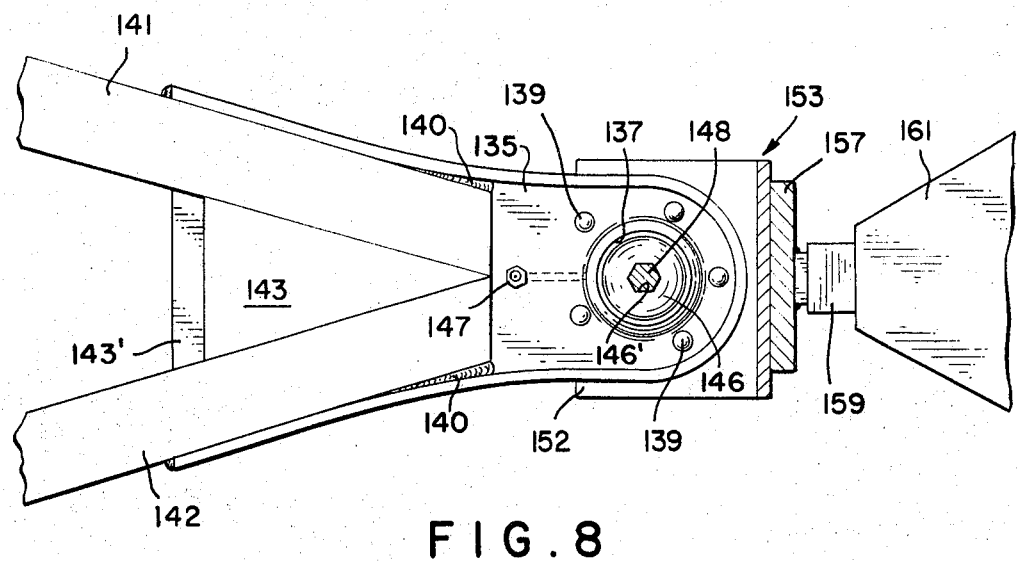

FIG. 8 is a horizontal sectional view of the hitch connection of FIG. 7 as viewed on line 8—8 thereof.

FIG. 9 is a collective perspective view of a removable hitch connection device that is connected to the trailer by double prongs insertable in parts that are welded to the trailer tongue and to the tow vehicle by a prong insertable in the hitch tube on the vehicle.

FIG. 10 is a fragmentary longitudinal sectional view of the hitch connection device of FIG. 9 with portions broken away and shown in section and with the hitch connection device being connected by prongs with the trailer and tow vehicle receiving tubes.

FIG. 11 is a perspective view of a hitch connection device free of the trailer and vehicle parts and having double prong shafts for connection with the trailer that are connected in common with the universal opposing ball plates in a slightly different manner from the hitch connection of FIG. 9, the device of this figure being similarly connected to trailer and vehicle parts not shown in FIG. 11 but shown in FIGS. 9 and 10.

FIG. 12 is a perspective view of the central ball to which the trailer hitch plates are connected for universal pivotal movement, the ball having a hexagonal vertical opening engageable with the pin bolt of similar section so that the ball is held in the bracket against rotation.

FIG. 13 is a collective view of a U-shaped bracket with its prong for connection to the square tube on the tow vehicle and of the pin and its retainer for so connecting the same to the tow vehicle, the bracket being formed as a stamping with side flanges.

Referring now to FIGS. 1 to 4, there is shown the trailer hitch connection device constructed according to the first form of the invention and indicated generally at 15 that is arranged so that it can be removed as a unit from a tow vehicle 16 and as well from a trailer tongue 17. The tow vehicle may be equipped with a rear bumper 18 and a frame 19 to which a square tube 21 is welded and extends rearwardly beyond the bumper 18, centrally of the vehicle and of the bumper and adapted to removably receive a square prong or shaft 22 projecting forwardly from a body plate 23 of the hitch connection device 15. The prong 22 is shouldered at 24 for engagement with the end of the tube 21 and for alignment with a hole in the prong 22 with transverse openings at the sides of the square tube 21 in order that a headed hitch pin 26 may be extended therethrough to thereby retain the hitch connection device upon the tow vehicle. A keeper pin 27 extends through the hitch pin 26 to hold the same against lateral displacement from the tube 21 and the prong 22 and against accidental release of the hitch connection device 15 from the vehicle 16.

The prong 22 is weldingly secured at 28 to the plate 23 and extends rearwardly and perpendicularly therefrom. The prong has a threaded stud projection 29 that is threaded into an opening in the plate 23 to provide a further connection of the prong with the plate 23 in addition to the weld 28 and so that the weld 28 will be relieved of the full tension created by the pulling of the trailer through the hitch connection 15. A U-shaped hitch bracket 31 extends from the opposite face of the plate 23 and is similarly secured to the plate 23 by a stud bolt 32 and weld material 33. This bracket 31 has upper and lower rearwardly extending opposing arms 34 and 35. These arms each have respectively hexagonally shaped openings 37 and 38 and are vertically aligned with one another to receive a headed attaching pin 39 having a corresponding hexagonal section shank. Upon the shank of this pin 39 are assembled upper and lower spacing washers 41 and 42 and a hitch ball 43 that has a hexagonal opening extending vertically therethrough so that with the bolt 39 being locked by the hexagonal connection with the upper and lower arms of the bracket 31 and with the hexagonal opening of the ball 43, the ball 43 is held against rotation upon the bolt pin 39.

Overlying the ball 43 from the top and below are respectively joined upper and lower plates 44 and 45 that have curved openings 47 and 48 respectively which when mated together extend over a large surface area of the ball 43 and can be worked thereover in a universal manner, up and down and sideways. These plates are locked together over the ball by screw bolts 49. Riveted or welded over the plates 44 and 45 is prong member 51 having a flange 52 with parallel portions 53 and 54 extending forwardly from the flange 52 and secured by rivets 55 or welds to the universal attaching plates 44 and 45.

As best seen in FIG. 3 a trailer is provided with forwardly extending converging tubes 57 and 58 joined together by upper and lower plates 59 and 61 and to the under plate a square tube 62 is welded to extend forwardly therefrom and into which a prong 51 is thrust for connection by a hitch pin 63 extending through opening 64 in the opposite sides of the tube 62 and an opening 65 in the prong 51 to hold the hitch connection 15 upon the trailer tongue 17. A spring pin keeper 67 can extend downwardly through the outer end of the hitch pin 63 to hold it against accidental axial displacement from the prong and tube 62 and the release of the trailer from the hitch connection 15.

The plates 44 and 45 are grooved on their inner faces as indicated at 68 to receive a lubricating oil or grease to overcome wear of the rounded surfaces of their openings 47 and 48 upon the ball surface.

The trailer can be detached from the tow vehicle either from the tow vehicle itself by pulling the pin 26 from its tube 21 to release the hitch connection device with the trailer or the hitch connection device 15 may be left upon the vehicle and the pin 63 pulled to release the prong 51 from the tube 62 carried on the trailer tongue 17. If desired, both pins 26 and 63 can be pulled so that the hitch connection device 15 is made free of the vehicle and the trailer and removed as a unit and located in a vehicle or at some location where it is not readily accessible to unauthorized persons. To assist in the handling of this connection device a handle 69 is fixed to the top arm 34 of the bracket 31 and extending upwardly therefrom. By this handle 69 the hitch connection device can be carried from one location to another and made inaccessible to others if desired and thereby provide for an anti-theft means for preventing the easy driving away with trailers. In FIG. 5 there is shown a modification of the hitch connection means that differs from the above described hitch connection device 15 in that no provision is made for the full detachment or removing of the hitch device from both the vehicle and the trailer to locate the same inaccessible to others. The prongs are not used for this purpose and reliance must be made upon a finger hole ring headed ball attaching bolt 71 having a shank of hexagonal section to disconnect the trailer from the vehicle, the universal ball and socket connection being provided in this hitch connection as with the first form of the invention but being a little differently fabricated. A U-shaped bracket 72 has upper and lower rearwardly extending arms 73 and 74 having respectively hexagonal openings 76 and 77 that are aligned with one another to receive the hexagonal shank of the bolt 71. This bolt extends through a hexagonal opening 78 on a hitch ball 79 and washers 81 and 82 above and below the same and projected downwardly below the lower arm 74 to receive pin 83. To the underside of the bracket 72 there is fixed by means of welding material 84 and 85 a forwardly extending prong 86 that can be adapted to be fitted in a square tube on the tow vehicle or which can be directly welded to frame members located on the underside of the vehicle so that the bracket 72 will project rearwardly and centrally of the vehicle to receive a trailer tongue assembly 87 which can be formed as shown in FIG. 3 of two members 57 and 58 converging on one another but held by a plate 88 and to the underside of which there is welded an assemblage of opposingly arranged ball receiving upper and lower socket plates 89 and 91 joined together by rivets 92 into a rigid assembly and welded as indicated at 93 and 94 to the underside of the trailer tongue 87. These plates 89 and 91 respectively have opposed flanged openings 95 and 96 for receiving respectively upper and lower halves of the ball 79 to provide a universal connection therewith whereby the trailer can swing laterally to the right or left of the tow vehicle or up and down with respect thereto.

Upon removal of the hitch pin 71, the ball 79 can be disconnected from the bracket 72 along with the trailer members 89 and 91 and since the bolt 71 has a shank of hexagonal or polygonal section so as to hold the ball 79 fixed and since this bolt is of unusual formation to be difficult to locate such a pin readily which would fit the ball opening 78 and thus act in a way to prevent possible theft of the trailer by another tow vehicle. Since there are hexagonal openings in the arms 73 and 74 as well as in the ball 79, the ball 79 is held rigid against turning movement at all times and an ordinary pin or bolt without the hexagonal shank would not permit this type of a connection with the tow bracket 72. The plates 89 and 91 can be formed from a forging or stamping operation from stock sheet material and similarly the bracket 72 may be formed from stock sheet material cut to the desired shape as seen in FIGS. 6 and 13. In FIG. 6 there is shown a still further form of the invention wherein a bracket 97 is formed from a stamping or forging thereby eliminating the need for a machining operation and a trailer connection assembly is formed of straight stock plates 98 and 99 secured together by bolts 101 with oil grooves 102 therebetween and having respectively curved openings 103 and 104 overlying the top and bottom halves of a hitch ball 105 rigidly secured between bracket arms 107 and 108 by a lock bolt 110 extended through hexagonal shaped holes 109 and 111 in respective opposingly depressed formations 112 and 113 of the respective bracket arms 107 and 108. In the depression 112 head 114 lies and in the upwardly extending depression 113 of the arm 108 a washer 115 and a nut 116 lie. The nut 116 of course can be removed to detach the bolt 110 and thereby allow the trailer to be disconnected from the bracket 97. This would leave the bracket 97 on tow vehicle 118 and its rear bumper 119. However if it is desired to remove the bracket free of the tow vehicle 118 the prong 121 extending rearwardly from the bight of the bracket 97 can be released from square tube 122 welded to a bottom plate 123 attached to the vehicle and upon removing hitch pin 124 from the side of the tube 122 and from the prong 121. In FIG. 13 there is shown more in detail the construction of this bracket 97 and its prong 121. This bracket 97 is provided with side flanges 126 and 127 to the inner faces of which there is welded respectively rearwardly extending vertical plates 128 FIG. 13 and a bridging bottom plate support bar 130 129 and to which and to the bracket as by welding 131 the prong 121 is made secure and extends perpendicularly rearwardly from the bright of the bracket 97 and within the plates 129 and 131. As shown in FIG. 13, the pin 124 may have a ring formation 132 through which a finger can be slipped to effect the withdrawal of the pin 124 from the tube 122 and the prong 121 upon a spring retainer 133 first being removed from a hole 134 in pin 124 and located at the opposite side of the tube 122 from the ring 132. The forward edges of the vertical plates 128 and 129 serve as stop shoulders for the insertion of the prong 121 into the tube 122 by engaging the end thereof and to thereby locate the openings for the easy insertion of the retaining pin 124. It should be apparent at this point that bracket 97 is formed from a stamping of forging and can also be used with a trailer universal socket assembly also formed of stampins stampings in FIGS. 5, 7 and 8 of upper and lower flanged plates 135 and 136 having respectively curved openings 137 and 138 and secured together by a series of rivets 139, and when taken with part 97 as best shown in FIBS. 6 and 13, it can be seen that both critical parts of the hitch connection device can be formed of die stamped or forged parts made from sheet metal.

In the form of the invention shown in FIGS. 7 and 8, the trailer plate coupling assembly already described in connection with FIG. 13 is used and thus the numerals applied to FIG. 13 are being applied to FIGS. 7 and 8. The plates 135 and 136 can be secured to the sides of converging trailer tongue members 141 and 142 running parallel with the flanges of the plates 135 and 136 and intermediate triangular-shaped plate 143 143' welded between the forward ends of the tongue members 141 and 142 to secure the same together and to provide for rigidity of the tongue at this location. The two plates 135 and 136 are provided with grooves on their inner face as indicated at 144 to provide grooves for conducting grease to the openings 137 and 138 and upon ball 146 upon a pressure gun secured to a fitting 147 in the top plate 135. The ball 146 is formed and shaped similar to the balls 43 and 79 with little if any flattening at their top and bottom and has a vertically extending through opening 146' of hexagonal or polygonal cross-section through which a shank of hexagonal section 148 can be extended to be secured thereto against rotation of the ball 146 thereupon. Shank 148 has a head 149 that limits the downward displacement of the shank 148 through upper and lower arms 151 and 152 of a U-shaped bracket 153 formed of plate stock and the ball 146 is kept vertically spaced relative to the arms 151 and 152 and upon the bolt shank 148 by washers 154 and 155 welded respectively to the inner faces of the respective arms 151 and 152. Both the arms 151 and 152 and the washers 154 and 155 have opening of hexagonal or polygonal section corresponding to the bolt section to hold the bolt and washers against turning.

The bracket 153 has a vertically extending plate 157 secured to the bight of the bracket by welding material 158. The lower end of this plate extends downwardly below the arm 152 and to this lower end there is attached a forwardly extending member 159 which is in turn rigidly attached to a vehicle plate 161 of the tow vehicle. In this manner the bracket 153 will have been made rigidly attached to the tow vehicle so that it cannot be separated therefrom. Thus the only way that the trailer and the hitch members 135 and 136 can be separated from the bracket 153 and the tow vehicle is by pulling the bolt shank 148 from the ball 146 to thereby release the ball from the bracket 153 and the trailer from the vehicle. Without this particular shaped pin 148 it would be difficult to attach the trailer to any other form of hitch not including such a shaped bolt shank 148. The bolt shank 148 when removed can be kept by the operator of the vehicle in an inaccessible place and away from unauthorized persons.

However, in order to keep the bolt shank 148 in place when being temporarily parked with the trailer in tow from the vehicle, a key lock mechanism 162 having a bolt latch 163 that overlies the head 149 of the bolt shank 148 above the top arm 153 that would hold the bolt in place against upward vertical displacement and which could only be removed by a holder of a key 164 that fits the lock mechanism 162 to release the laterally extending latch 163. Thus there has been provided an anti-theft means where the separable hitch parts are rigidly connected respectively to the tow vehicle and the trailer and wherein separation of the same can only be effected by one having a key 164 and the bolt 148.

Referring now to FIGS. 9 and 10, there is shown a separable hitch connection device indicated generally at 170 that is removable as a unit from between a tow vehicle hitch assembly 171 and a double pronged receiving trailer hitch assembly 172. The principal difference between this form of the invention and the other forms of the invention and particularly the first form of the invention is that the double prong assembly 173 is used for the connection of the intermediate hitch connection device 170 with the double tube trailer assembly 172. The two pronged trailer hitch part 173 is connected to the vehicle hitch part 174 in the usual manner as above described by a hexagonal shaped shank bolt 175 in the manner above described in connection with the form of the invention shown in FIGS. 1 to 4.

The tow vehicle assembly 171 has a plate 176 that is welded to the underface of the vehicle and which has welded to it a longitudinally extending square section tube 177 having pin holes 178 and 179 on the opposite side faces thereof. This tube 177 is adapted to detachably receive a single prong 181 having a pin receiving hole 182 that will match with the holes 178 and 179 in the tube 177 when the prong 181 is extended into the tube 177 up to a stop flange 183 on the prong 181. Prong 181 is welded at its rear end to a vertically extending plate 184 which is in turn welded to the bight of a U-shaped bracket 186 having upper and lower arms 187 and 188 having respectively hexagonal shaped openings 189 and 190 through which the hexagonal shaped bolt 175 extends and is welded against upward displacement as indicated at 192 to the arm 188. The bolt 175 extends through a ball 193 through a hexagonal opening 194 therein. The ball 193 is shaped as best seen in FIG. 12 and like balls 79 and 105 have their top and bottom faces flattened to cooperate with washers 196 and 197 to hold the ball 193 intermediately spaced between the arms 197 and 198.

The double pronged part 173 has forward plates 198 and 199 that have socket openings adapted to overlie the top and bottom halves respectively of the ball 193 to provide a universal and ball and socket connection therewith. These plates are joined together over the ball by rivets 201.

Rigidly connected to the joined plates 198 and 199 is a yoke 202 that has a lifting handle 203 thereon and joined by welding material 204 with the plates 198 and 199 to extend rearwardly therefrom. The outer ends of the yoke are provided with parallel prongs 206 and 207 with respective stop flanges 208 and 209 and respective pin holes 211 and 212.

The trailer assembly 172 has parallel square tubes 213 and 214 spaced apart to receive these respective prongs 206 and 207 up to the flanges 208 and 209 thereof and which have respectively holes 216 and 217 that cooperate with the holes 211 and 212 of the prongs 206 and 207 to receive pull pins 218 of the type shown in FIG. 13 including a pin 124 and a retainer 133. These tubes 213 and 214 are secured to an attaching plate 219 that can be bolted to or otherwise attached to the forwardly extending tongue members of the trailer.

The hitch connection device 170 can be removed completely from the tow vehicle and the trailer and concealed in the tow vehicle trailer against access by an unauthorized person. The hitch connection device is lifted as a unit by its handle 221 extending from the top arm 187 of the bracket 186 and the other hand can grip the handle 203 on the yoke 202. The handle 203 on the yoke however will be helpful in vertically positioning the yoke 202 and the prongs 206 and 207 once the hitch connection part 174 is fixed to the vehicle in order to locate the prongs vertically within the trailer tubes 213 and 214, the yoke 202 thereby being adjustable normally up and down on the ball 193 but laterally thereof.

In FIGS. 11 and 12 there is shown another form of the invention having a two pronged attachment with the trailer attaching tubes. This hitch connection device is indicated generally at 225 and is a self-contained and similar to the device 170 of FIGS. 9 and 10 and attachable to square tube 177 of the tow vehicle and the double tubes 213 and 214 of the trailer in the same manner and does not need to be shown. This hitch connection device 225 has a U-shaped bracket 226 with overlying rearwardly extending and vertically spaced upper and lower arms 227 and 228. A handle 229 is provided on the upper arm for the purpose of lifting and transporting the device as a unit. Connected to the bracket 226 is a plate 231 that depends below the lower arm 228 and has a flanged prong 232 with a pin attaching hole 233 and a stop flange 234. The prong 232 will fit in a square tube either detachably or fixedly mounted on a tow vehicle.

Between the arms 227 and 228 there extends a hexagonal shaft 236 that is fixed to the arms 227 and 228 against axial displacement and being of hexagonal section to receive a ball 237 of FIG. 12 having top and bottom flat faces 238 and 239 and a hexagonal opening 241 extending therebetween. The ball 237 is held in place upon the hexagonal shaft 236 by welding of the flat faces 238 and 239 to the side faces of the shaft 236 so as to keep the ball 237 equally spaced on the shaft 236 between the arms 227 and 228 in a rigid manner. The shaft 236 cannot turn and neither can the ball 237 turn on the shaft. The shaft 236 cannot be displaced axially since it is welded to the bracket arms and the ball is held against axial displacement since it is welded to the shaft 236. In this manner, the disengagement of the trailer from the tow vehicle may be done with the removal of the hexagonal pin 236.

Overlying the upper and lower halves of the ball 237 are plates 242 and 243 riveted together by rivets 244.

To the plates 242 and 243, a bifurcated portion 246 of a cast yoke 247 is welded and this yoke has prongs 248 and 249 adapted to enter the square tubes 213 and 214 of the trailer assembly 172 shown in FIG. 9. These prongs 248 and 249 respectively have attaching holes 251 and 252 and stop flanges 253 and 254 serving to align the holes 251 and 252 with respective holes 216 and 217 of the square tubes 213 and 214.

It should now be apparent that there has been provided several forms of this invention with all of the forms having in common the manner in which the trailer hitch part is connected to a bracket vehicle part and that is by means of a ball having the hexagonal opening extending therethrough to which a pin of hexagonal section is extended and retained against rotation in the bracket arms. Means are provided so that the ball is held against vertical displacement on the hexagonal pin shank and the attachment to the ball of the trailer part is effected by opposing openings adapted to fit respectively the top and bottom parts of the ball surface. It is also seen according to certain other forms of the invention that the hitch connection device is removable as a unit from between the tow vehicle and the trailer and also wherein the hitch connection parts can be fixedly secured to the vehicle and to the trailer and the connection being effected by the removing of the hexagonal shank pin from the ball to allow the parts to be disconnected. In all forms of the invention it can be seen that the parts of the hitch connection device are removable, either the device as a unit or the hitch pin which is of special shape is removable and can be disposed at a location concealed from unauthorized persons who may wish to take off with the trailer. It is also seen that there has been provided in one of the forms of the invention wherein the hexagonal shank pin is removable a latch lock which can keep the shank pin in place upon the bracket part.

While various changes may be made in the detailed construction, it shall be understood that such changes will be within the spirit and scope of the invention as defined by the appended claims.

We claim:

1. A hitch connection for vehicle trailers comprising a bracket having vertically spaced arms with polygonal section openings, a shank pin of polygonal section extending between the arms and through the polygonal openings therein and thereby held therein against rotation therein, a ball having opening of corresponding polygonal section receiving the polygonal shank pin whereby the ball is held against rotation upon the shank pin and the shank pin held against rotation upon the bracket, means extending from the bracket for connecting the bracket to the vehicle against rotation and axial displacement therefrom, a trailer hitch part having a ball socket formed of two plates respectively having opposing openings overlying the respective top and bottom halves of the ball to permit up and down tilting and lateral shifting movement of the trailer part upon the rigidly held ball, and means rigidly connected through the plates and extending rearwardly for connection with a trailer to retain the trailer hitch part upon the trailer against axial and rotational movement with respect thereto.

2. A hitch connection for vehicle trailers as defined in claim 1, and said means for attaching said bracket to the vehicle including a square shaped prong and a square tube rigidly attached to the vehicle for slidably receiving said prong and pin means for holding said prong in the square sleeve.

3. A hitch connection for vehicle trailers as defined in claim 2, and means for attaching the trailer universal socket part to the trailer including a prong and a square tube adapted to be secured rigidly to the trailer tongue and to slidably receive the prong of the universal socket trailer part and pin means laterally extendable through the tube and the prong to hold the prong against axial displacement from the tube, said hitch connection being thereby removable as a unit from between the vehicle and the trailer to render the hitch connection ineffective for use.

4. A hitch connection for vehicle trailers as defined in claim 1 and said bracket being formed of stamped metal having outside flanges continuing around the full extent of the bracket and depressed portions opposing one another and engageable by the ball to hold the ball against axial displacement upon the polygonal shaped pin and said depressions having polygonal openings for retaining the pin against rotation relative to the bracket.

5. A hitch connection for vehicle trailers as defined in claim 4 and said trailer universal socket comprising stamped flanged plates having outwardly depressed ball receiving openings and connected together in opposing relationship to one another.

6. A hitch connection for vehicle trailers as defined in claim 1 and said polygonal shank pin being headed and axially removable from the bracket and the ball to release the trailer universal socket part and ball from the bracket, means for releasably holding said pin against axial displacement and spacing means with polygonal openings upon the pin shank and engagable with the bracket spaced arms for retaining the ball upon the shank against upward and downward sliding movement while the ball and the shank are being held against rotational movement one with the other and the shank within the bracket.

7. A hitch connection for vehicle trailers as defined in claim 6 and a key latch device carried upon the bracket and said polygonal shank pin being removable from the bracket and the ball and having a head and said key latch device having a latch adapted to overlie the head upon being locked whereby to keep the polygonal pin in place within the bracket and the ball against unauthorized persons removing the pin.

8. A hitch connection for vehicle trailers as defined in claim 1, said trailer hitch including a yoke extending from the coupled universal ball socket plates and having spaced prongs thereon to be accommodated by cooperative spaced tubes on the trailer, pin means for releasably retaining the prongs within the tubes against axial displacement therefrom, said bracket having a forwardly extending prong adapted to slidably engage a tube secured on the vehicle and pin means for holding the prong within the tube against axial displacement therefrom whereby the hitch connection may be removed from the vehicle and the trailer as a unit upon disconnection of the pin means of the prongs and tube.

9. A hitch connection for vehicle trailers as defined in claim 8 and handle means extending upwardly from said bracket and from the yoke for carrying and adjusting the unit.

* * * * *